(12) United States Patent
Carruthers

(10) Patent No.: US 6,939,394 B2
(45) Date of Patent: Sep. 6, 2005

(54) GAS STORAGE AND DISPENSING SYSTEM WITH MONOLITHIC CARBON ADSORBENT

(75) Inventor: J. Donald Carruthers, Fairfield, CT (US)

(73) Assignee: Advanced Technology Materials, Inc., Danbury, CT (US)

( * ) Notice: Subject to any disclaimer, the term of this patent is extended or adjusted under 35 U.S.C. 154(b) by 0 days.

(21) Appl. No.: 10/767,901

(22) Filed: Jan. 29, 2004

(65) Prior Publication Data

US 2004/0185254 A1 Sep. 23, 2004

Related U.S. Application Data

(63) Continuation of application No. 10/315,635, filed on Dec. 10, 2002, now Pat. No. 6,743,278.

(51) Int. Cl.[7] .............................................. B01D 53/04
(52) U.S. Cl. .............................. 96/108; 96/134; 96/154; 55/DIG. 5; 502/417; 502/426
(58) Field of Search ................................ 502/416, 417, 502/425–427; 95/133, 141, 143–149, 901; 96/108, 122, 130, 134, 143, 154; 55/DIG. 5

(56) References Cited

U.S. PATENT DOCUMENTS

| | | |
|---|---|---|
| 3,539,467 A | 11/1970 | Bozarth et al. |
| 3,884,830 A | 5/1975 | Grant |
| 4,000,236 A | 12/1976 | Redfarn et al. |
| 4,082,694 A | 4/1978 | Wennerberg et al. |
| 4,139,416 A | 2/1979 | Colletta |
| 4,526,887 A | 7/1985 | Sutt, Jr. |
| 4,528,281 A | 7/1985 | Sutt, Jr. |
| 4,540,678 A | 9/1985 | Sutt, Jr. |
| 4,738,753 A | 4/1988 | Corato et al. |
| 4,880,765 A | 11/1989 | Knoblauch et al. |

(Continued)

FOREIGN PATENT DOCUMENTS

| | | |
|---|---|---|
| JP | 55073315 | 11/1978 |
| JP | 01131015 | 5/1989 |
| JP | 07124468 | 5/1995 |
| WO | 2000015330 | 3/2000 |
| WO | 2001093985 | 12/2001 |

OTHER PUBLICATIONS

Dacey, J.R., Thomas, D.G., *Trans. Farad. Soc*, 50 (1954), 740.

Rouquerol, F., Rouquerol, J., Sing, K.S.W., *Adsorption by Powders & Porous Solids*, Academic Press, 1999, p. 276.

Carrott, P.J.M., Roberts, R.A., Sing, K.S.W., *Characterization of Porous Solids*, K.K. Unger et al. Editors, Elsevier Science, Amsterdam, 1988, p. 89.

(Continued)

*Primary Examiner*—Robert H. Spitzer
(74) *Attorney, Agent, or Firm*—Steven Hultquist; Margaret Chappuis; John Boyd

(57) ABSTRACT

A fluid storage and dispensing apparatus, including a fluid storage and dispensing vessel having an interior volume, in which the interior volume contains a physical adsorbent sorptively retaining a fluid thereon and from which the fluid is desorbable for dispensing from the vessel, and a dispensing assembly coupled to the vessel for dispensing desorbed fluid from the vessel. The physical adsorbent includes a monolithic carbon physical adsorbent that is characterized by at least one of the following characteristics: (a) a fill density measured for arsine gas at 25° C. and pressure of 650 torr that is greater than 400 grams arsine per liter of adsorbent; (b) at least 30% of overall porosity of the adsorbent including slit-shaped pores having a size in a range of from about 0.3 to about 0.72 nanometer, and at least 20% of the overall porosity including micropores of diameter <2 nanometers; and (c) having been formed by pyrolysis and optional activation, at temperature(s) below 1000° C., and having a bulk density of from about 0.80 to about 2.0 grams per cubic centimeter.

53 Claims, 5 Drawing Sheets

U.S. PATENT DOCUMENTS

| | | | | |
|---|---|---|---|---|
| 4,957,897 | A | * 9/1990 | Maroldo et al. | 502/432 |
| 5,071,820 | A | 12/1991 | Quinn et al. | |
| 5,110,328 | A | 5/1992 | Yokota et al. | |
| 5,356,852 | A | * 10/1994 | DeLiso et al. | 502/402 |
| 5,372,610 | A | 12/1994 | Greinke et al. | |
| 5,376,609 | A | * 12/1994 | Guile | 502/62 |
| 5,416,056 | A | 5/1995 | Baker | |
| 5,518,528 | A | 5/1996 | Tom et al. | |
| 5,658,372 | A | 8/1997 | Gadkaree | |
| 5,674,462 | A | 10/1997 | Hayden et al. | |
| 5,710,092 | A | 1/1998 | Baker | |
| 5,744,421 | A | 4/1998 | Robinson et al. | |
| 5,837,741 | A | * 11/1998 | Schwarz et al. | 521/124 |
| 5,846,639 | A | 12/1998 | Robinson et al. | |
| 5,851,403 | A | 12/1998 | Petrisko et al. | |
| 5,902,562 | A | 5/1999 | Lagasse et al. | |
| 5,912,424 | A | 6/1999 | Judkins et al. | |
| 5,914,294 | A | 6/1999 | Park et al. | |
| 5,965,483 | A | 10/1999 | Baker et al. | |
| 5,972,253 | A | 10/1999 | Kimber | |
| 6,006,797 | A | 12/1999 | Bulow et al. | |
| 6,019,823 | A | 2/2000 | Tischler et al. | |
| 6,030,698 | A | 2/2000 | Burchell et al. | |
| 6,156,697 | A | 12/2000 | Gadkaree | |
| 6,171,373 | B1 | 1/2001 | Park et al. | |
| 6,187,713 | B1 | 2/2001 | Gadkaree | |
| 6,207,264 | B1 | 3/2001 | Robinson et al. | |
| 6,225,257 | B1 | 5/2001 | Putyera et al. | |
| 6,258,300 | B1 | 7/2001 | Burchell et al. | |
| 6,284,705 | B1 | 9/2001 | Park et al. | |
| 6,309,446 | B1 | 10/2001 | Nakanoya et al. | |
| 6,309,449 | B1 | * 10/2001 | Klos et al. | 96/108 |
| 6,406,519 | B1 | * 6/2002 | Tom et al. | 95/95 |
| 6,475,411 | B1 | * 11/2002 | Burchell et al. | 264/29.6 |
| 6,500,238 | B1 | * 12/2002 | Brandes et al. | 95/148 |
| 6,592,653 | B2 | * 7/2003 | Wang et al. | 95/131 |
| 6,699,561 | B2 | * 3/2004 | Wolff | 428/116 |
| 6,743,278 | B1 | * 6/2004 | Carruthers | 95/133 |
| 6,764,755 | B2 | * 7/2004 | Tom et al. | 428/304.4 |
| 2001/0027723 | A1 | 10/2001 | Jain et al. | |
| 2002/0020292 | A1 | 2/2002 | Wojtowicz et al. | |
| 2002/0073847 | A1 | 6/2002 | Sheline et al. | |
| 2002/0103081 | A1 | * 8/2002 | Wolff | 502/413 |
| 2003/0145731 | A1 | 8/2003 | Brasio | |
| 2003/0196553 | A1 | * 10/2003 | Mochizuki et al. | 96/153 |
| 2004/0118286 | A1 | * 6/2004 | Brestovansky et al. | 96/108 |

OTHER PUBLICATIONS

Sing, K.S.W., Everett, D.H., haul, R.A.W., Mousou, L., Pierotti, R.A., Rouquerol, J., Siemieniewska, T., *Pure & Appl. Chem.*, 57 (1985) 603.

Parkyns, N.D.,, Quinn, D.F., *Porosity in Carbons: Characterization and Applications*, Editor: Patrick, J.P. Halsted Press, (John Wiley) N.Y., 1995, p. 292.

Wojtowicz, M.A., Markowitz, B.L., Smith, W.W., Serio, M.A., *Int. J. of the Soc. Of Mat. Eng. for Resources, 7, 2, (1999)* 253.

D.F. Quinn and J.A. MacDonald, "Natural Gas Storage", Carbon, vol. 30, No. 7, pp. 1097–1103, 1992.

J.A.F. MacDonald and D.F. Quinn, "Carbon Adsorbents for Natural Gas Storage", Fuel, 1998, vol. 77, No. 1/2, pp. 61–64.

J.R. Dacey and D.A. Cadenhead, The Roayl Military College of Canada, Kingston, Ontario "The Formation of Carbon From Polyvinylidene Choride", Reprint from "Proceedings of the Fourth Conference on Carbon", Pergamon Press, 1960, pp. 315–319.

* cited by examiner

GAS STORAGE AND DISPENSING SYSTEM WITH MONOLITHIC CARBON ADSORBENT

This is a continuation of U.S. Ser. No. 10/315,635, filed on Dec. 10, 2002, and issued on Jun. 1, 2004 as U.S. Pat. No. 6,743,278.

FIELD OF THE INVENTION

The present invention relates generally to gas storage and dispensing systems, and particularly to systems of such type utilizing a monolithic carbon sorbent as a gas storage medium.

DESCRIPTION OF THE RELATED ART

The physical adsorbent-based gas storage and dispensing system disclosed in Tom et al. U.S. Pat. No. 5,518,528 has revolutionized the transportation, supply and use of hazardous gases in the semiconductor industry. The system includes a vessel holding a physical adsorbent medium such as molecular sieve or activated carbon, having sorptive affinity for the gas that is to be stored in and selectively dispensed from the vessel. The gas is held in the vessel in an adsorbed state on the sorbent medium at reduced pressure relative to a corresponding empty (of sorbent) vessel holding an equivalent amount of gas in the "free" (unadsorbed) state.

By such reduced pressure storage, the safety of the gas storage and dispensing operation is substantially improved, since any leakage will result in a very low rate of egress of gas into the ambient environment, relative to a conventional high pressure gas storage cylinder. Further, the low pressure operation of the adsorbent-based system is associated with a lower likelihood of such gas leakage events, since the reduced pressure reduces the stress and wear on system components such as valves, flow controllers, couplings, joints, etc.

In such adsorbent-based gas storage and dispensing systems, the working capacity of the physical adsorbent medium is an operating constraint. The working capacity is the amount of gas that can be stored ("loaded") on the sorbent medium and desorptively removed from such sorbent medium for use. The working capacity is a function of the storage pressure of the gas in the sorbent medium-containing gas storage vessel, and the dispensing condition of the desorbed gas (e.g., dispensing pressure of the desorbed gas, when pressure differential is used to effect desorption, and temperature levels of respective storage and dispensing conditions, when thermal desorption of gas is used as the dispensing modality), and the type and character of the sorbent medium itself (e.g., involving such parameters as sorbent media size, shape, porosity, pore size distribution, and tortuosity of interior pore passages).

The art is continually seeking improvement in working capacity of the physical adsorbent-based gas storage and dispensing system.

SUMMARY OF THE INVENTION

The present invention relates to physical adsorbent-based gas storage and dispensing systems, and to an improved working capacity system of such type.

In one aspect, the present invention relates to a fluid storage and dispensing apparatus, comprising a fluid storage and dispensing vessel having an interior volume, wherein the interior volume contains a physical adsorbent sorptively retaining a fluid thereon and from which the fluid is desorbable for dispensing from the vessel, and a dispensing assembly coupled to the vessel for dispensing desorbed fluid from the vessel, wherein the physical adsorbent comprises a monolithic carbon physical adsorbent that is characterized by at least one of the following characteristics:

(a) a fill density measured for arsine gas at 25° C. and pressure of 650 torr that is greater than 400 grams arsine per liter of adsorbent;

(b) at least 30% of overall porosity of said adsorbent comprising slit-shaped pores having a size in a range of from about 0.3 to about 0.72 nanometer, and at least 20% of the overall porosity comprising micropores of diameter <2 nanometers; and (c) having been formed by pyrolysis and optional activation, at temperature(s) below 1000° C., and having a bulk density of from about 0.80 to about 2.0 grams per cubic centimeter.

Another aspect of the invention relates to a method of forming a monolithic adsorbent for use in a gas storage and dispensing system, said method comprising: molding a pyrolyzable material into a monolithic shape; and pyrolyzing the pyrolyzable material under pyrolysis conditions producing a monolithic adsorbent that is characterized by at least one of the following characteristics:

(a) a fill density measured for arsine gas at 25° C. and pressure of 650 torr that is greater than 400 grams arsine per liter of adsorbent;

(b) at least 30% of overall porosity of said adsorbent comprising slit-shaped pores having a size in a range of from about 0.3 to about 0.72 nanometer, and at least 20% of the overall porosity comprising micropores of diameter <2 nanometers; and (c) a bulk density of from about 0.80 to about 2.0 grams per cubic centimeter, wherein the aforementioned pyrolysis conditions comprise temperature below 1000° C.

A further aspect of the invention relates to a method of storing and dispensing a gas, comprising: fabricating a gas storage and dispensing vessel; disposing a physical adsorbent in the vessel having sorptive affinity for said gas; charging said gas to said vessel for adsorption on the physical adsorbent; sealing the vessel with a valve head containing an actuatable valve, to enclose the physical adsorbent and adsorbed gas, and isolate same from an exterior environment of the vessel; desorbing the adsorbed gas from the physical adsorbent, and actuating the actuatable valve in the valve head, to flow gas from the vessel and through the actuatable valve, for gas dispensing; wherein the physical adsorbent is characterized by at least one of the following characteristics:

(a) a fill density measured for arsine gas at 25° C. and pressure of 650 torr that is greater than 400 grams arsine per liter of adsorbent;

(b) at least 30% of overall porosity of said adsorbent comprising slit-shaped pores having a size in a range of from about 0.3 to about 0.72 nanometer, and at least 20% of the overall porosity comprising micropores of diameter <2 nanometers; and (c) a bulk density of from about 0.80 to about 2.0 grams per cubic centimeter, wherein said pyrolysis conditions comprise temperature below 1000° C.

Other aspects, features and embodiments of the present invention will be more fully apparent from the ensuing disclosure and appended claims.

DETAILED DESCRIPTION OF THE INVENTION, AND PREFERRED EMBODIMENTS THEREOF

Figure 1:
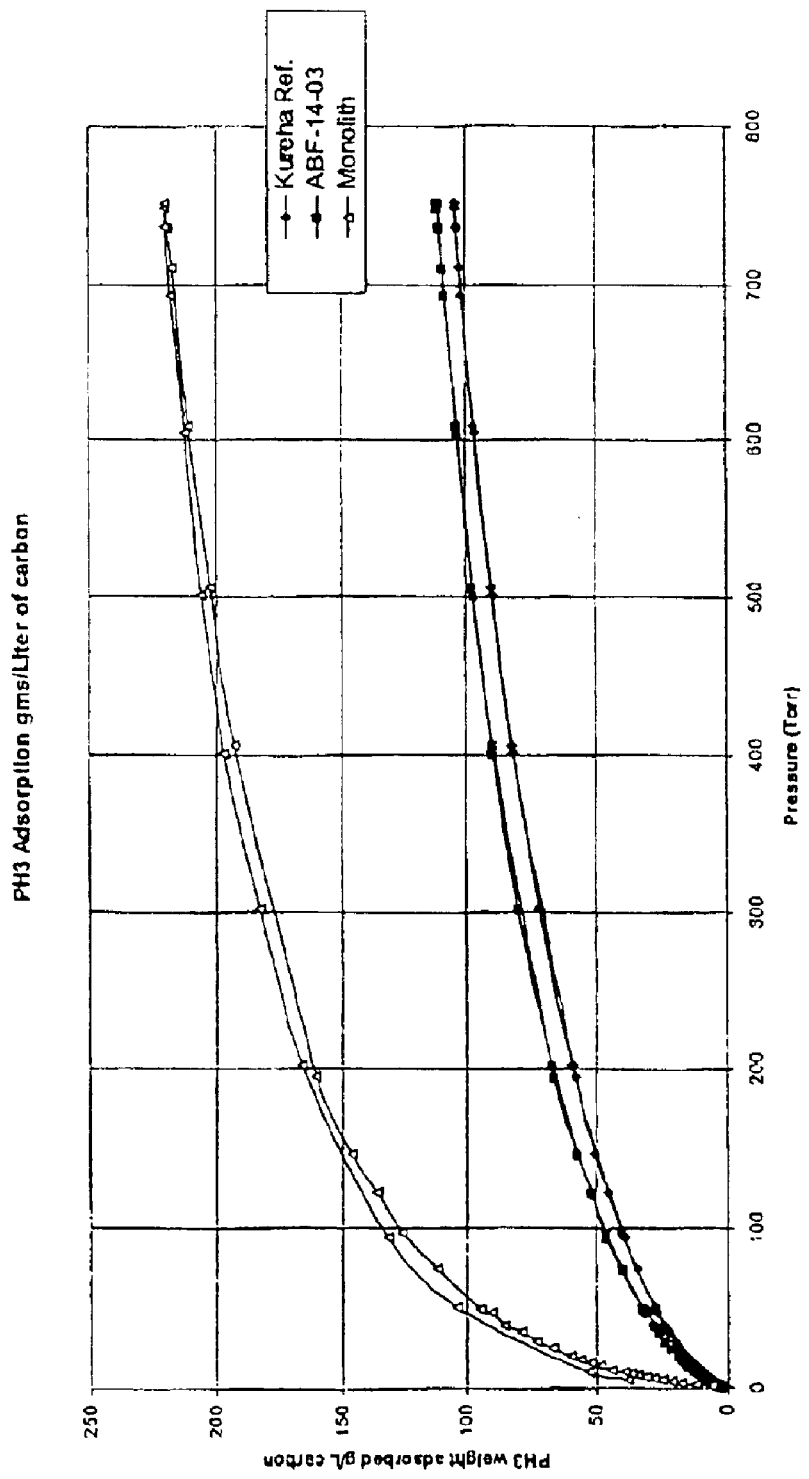
FIG. 1 is a graph of weight in grams of phosphine ($PH_3$) adsorbed per liter of carbon, as a function of pressure level, in torr, for a Kureha 578-66-6 bead activated carbon (data points marked by solid diamond markers), a Takachiho ABF 14-03 particulate activated carbon (data points marked by solid square markers), and carbon formed from polyvinylidene chloride polymer (Saran A, Dow Chemical Co.) (data points marked by open triangular markers).

The present invention is based on the discovery that a physical adsorbent-based fluid storage and dispensing apparatus may be fabricated utilizing a fluid storage and dispensing vessel having a monolithic carbon adsorbent material therein, with surprising and unexpected advantages as regards the nature and extent of sorption and desorption of gas on the adsorbent, the packing density achievable for the physical sorbent medium in the vessel, and the utility of the fluid storage and dispensing apparatus comprising such vessel for semiconductor manufacturing operations.

The present invention thus achieves a substantial advance in the art over adsorben-based gas storage and dispensing systems of the type described in Tom et al. U.S. Pat. No. 5,518,528 which heretofore have used physical sorbent media in a finely divided form, such as a so-called bead activated carbon. In accordance with the present invention, the gas storage and dispensing system can be significantly improved in working capacity when the activated carbon is provided, not in a bead or particulate form, but rather in a monolithic form of specific character.

The level of improvement achievable by the use of a monolithic form of activated carbon, relative to the finely divided forms used in the prior art, is highly unexpected, and is even more surprisingly improved when the gas storage and dispensing vessel is of a shape conforming to the adsorbent monolith.

For example, when the vessel is of a preferred cube or other rectangular parallelepiped shape, consistent with the disclosure of co-filed U.S. patent application Ser. No. 10/314,777 filed Dec. 9, 2002 in the names of Dennis Brestovarisky, Michael J. Wodjenaki, Jose I. Amo and J. D. Carruthers, for "Rectangular Parallelepiped Fluid Storage and Dispensing System," the use of a conformably shaped monolith can increase the working capacity of the physical adsorbent-based gas storage and dispensing system by at least 85% relative to a prior art system using a gas storage cylinder of the same "footprint" and vessel interior volume, filled with bead activated carbon.

By way of background explanation of the unanticipated advantages of the preferred packaging of the monolithic physical adsorbent of the invention in a rectangular parallelepiped conformation vessel in the physical adsorbent-based fluid storage and dispensing apparatus, it would on initial consideration appear to be highly disadvantageous to employ a rectangular parallelepiped conformation for a physical-adsorbent-based fluid storage and dispensing system, since: (i) a rectangular parallelepiped vessel has six faces, and twelve weld-lines required for fabrication if each face of the vessel is a separate piece (by contrast, a cylindrical vessel may be formed without seams from tubular rolled steel stock); (ii) consistent with (i), the fabrication cost of a rectangular conformation vessel would expected to be substantially higher than for a corresponding cylindrical vessel; (iii) a rectangular parallelepiped conformation involves "sharp" corners at the juncture of adjacent perpendicularly oriented walls that offer the potential of forming voids at the line of juncture, wherein the sorbent bed would not "pack" against the corner, relative to a corresponding cylindrical geometry vessel (which is free such corners, and instead is a minimum cross-sectional area shape circumscribing the bed of physical sorbent material in the interior volume of the vessel); and (iv) the intersection of two perpendicular walls with one another produces a joint that is susceptible to rupture by pressure or force directed thereon, relative to a "seamless" cylindrical vessel.

It has been determined, however, that the rectangular parallelepiped conformation results in a vessel which does have less tightly packed sorbent bed regions adjacent the seams at the intersection of adjacent walls, but that rather than being a disadvantage, such lower density sorbent bed regions are in fact advantageous as higher gas flow conductance pathways for interstitial desorbed or unadsorbed gas to flow out of the bulk volume of the sorbent bed.

Further, precisely because the cylindrical vessel is a minimum cross-sectional area conformation, with a minimum circumferential extent of circumscribing wall area, the amount of sorbent that is "presented" to the wall in the cylindrical vessel is maximized. Considering the converse, the peripheral extent of the wall that bounds (is adjacent to) the sorbent bed in cross-section is much greater in the rectangular parallelepiped conformation than in the cylindrical vessel. The rectangular parallelepiped conformation thereby enables higher volume egress of gas from the vessel than from a correspondingly sized cylindrical vessel, because the wall surface bounding the sorbent bed is non-adsorbing in character, and there is proportionally more of it in the rectangular conformation vessel, at the outer margins of the sorbent bed, than there is in the cylindrical vessel. As a result, the desorbed gas at the wall regions is less readsorbed subsequent to its initial desorptive release from the sorbent medium than desorbed gas in the interior portions of the sorbent bed.

For these reasons, the rectangular parallelepiped vessel conformation has particular utility for holding the monolithic form of the physical adsorbent of the present invention.

As used herein, "monolithic" means that the sorbent medium is in a unitary or block-like form, e.g., in the form of blocks, bricks, discs, boules, etc., in contradistinction to conventional finely divided forms such as beads, particles, granules, pellets, and the like, which are generally utilized in the form of a bed comprising a multiplicity of such beads, particles, granules, pellets, etc. Thus, in the bed form of multiple finely divided physical adsorbent elements, the void volume of the active sorbent is in major part interstitial, or inter-particle, in character, varying according to the dimensions, shape and packing density of the sorbent particles. By contrast, in a monolithic form, the void volume of the active sorbent is in form of porosity intrinsic to the sorbent material and voids that may have been formed in the bulk sorbent body during its processing.

The present invention in one aspect relates to a fluid storage and dispensing apparatus, comprising a fluid storage and dispensing vessel having an interior volume, wherein the interior volume contains a physical adsorbent sorptively retaining a fluid thereon and from which the fluid is desorbable for dispensing from the vessel, and a dispensing assembly coupled to the vessel for dispensing desorbed fluid from the vessel, wherein the physical adsorbent comprises a monolithic carbon physical adsorbent that is characterized by at least one of the following characteristics:

(a) a fill density measured for arsine gas at 25° C. and pressure of 650 torr that is greater than 400 grams arsine per liter of adsorbent;

(b) at least 30% of overall porosity of said adsorbent comprising slit-shaped pores having a size in a range of from about 0.3 to about 0.72 nanometer, and at least 20% of the overall porosity comprising micropores of diameter <2 nanometers; and (c) having been formed by pyrolysis and optional activation, at temperature(s) below 1000° C., having a bulk density of from about 0.80 to about 2.0 grams per cubic centimeter.

The monolithic adsorbent can be in the form of a single monolithic adsorbent article, or a multiplicity of monolithic adsorbent articles. The adsorbent can be suitably shaped to conform to the interior volume of the vessel in which it is disposed, and preferably occupies at least 60% of the interior volume of the vessel, e.g., from 75 to 95% of such interior volume. While the invention is discussed more fully hereinafter in respect of containment of the monolithic adsorbent in the preferred rectangular parallelepiped shaped vessel, it will be appreciated that the invention is not thus limited, and that other vessel shapes and conformations can be utilized, e.g., cylindrical-shaped vessels, barrel-shaped vessels, frustoconical-shaped vessels, etc.

The monolithic adsorbent can be formed as the pyrolysis product of an organic resin, and more generally can be formed from any suitable pyrolyzable material, such as for example polyvinylidene chloride, phenol-formaldehyde resins, polyfurfuryl alcohol, coconut shells, peanut shells, peach pits, olive stones, polyacrylonitrile, and polyacrylamide. The adsorbent can be formed in the fluid storage and dispensing vessel in which the fluid will be stored for subsequent dispensing, i.e., in situ, or the adsorbent can be formed and then introduced into the fluid storage and dispensing vessel. In one embodiment, the adsorbent has at least 20% of its porosity in pores with a diameter of less than 2 nanometers.

The adsorbent can be provided in the fluid storage and dispensing vessel as a multiplicity of monolithic adsorbent articles that aggregatively constitute the adsorbent mass. In such multiple monolithic article arrangement, each of the multiplicity of discrete monolithic adsorbent articles can have a length that is between 0.3 and 1.0 times the height of the interior volume of the vessel, and a cross-sectional area that is between 0.1 and 0.5 times the rectangular cross-sectional area of the vessel. Each of the multiplicity of discrete monolithic articles can have a rectangular parallelepiped shape or alternatively a cylindrical or other suitable shape. In the interior volume of the fluid storage and dispensing vessel, the discrete monolithic articles can be laterally and/or longitudinally abutted in surface contact with adjacent monolithic members. In one embodiment, each of the multiplicity of discrete monolithic articles has a length to cross-sectional dimension ratio, L/D, that is from about 2 to about 20, e.g., in a range of from about 4 to about 15, where L is the length or major axis dimension of the monolithic carbon sorbent article, and D is the transverse or minor axis dimension. In another embodiment, the monolithic adsorbent article can have a disc shape, with a height to diameter ratio, H/D, that is from about 0.10 to about 0.80.

The fluid in the fluid storage and dispensing vessel that is sorptively retained on the adsorbent, and desorbed under suitable desorbing conditions for dispensing of fluid, can be fluid of any suitable type, e.g., fluid having utility in semiconductor manufacturing, such as hydrides, halides and organometallic gaseous reagents, e.g., silane, germane, arsine, phosphine, phosgene, diborane, germane, ammonia, stibine, hydrogen sulfide, hydrogen selenide, hydrogen telluride, nitrous oxide, hydrogen cyanide, ethylene oxide, deuterated hydrides, halide (chlorine, bromine, fluorine, and iodine) compounds, and organometallic compounds.

The fluid in the vessel can be stored at any suitable atmospheric, sub-atmospheric or super-atmospheric pressure, e.g., pressure below 2500 torr, such as in a range of from about 20 torr to about 1200, or pressure in a range of from about 20 torr to about 750 torr for subatmospheric pressure supply of gases for ion implantation or other subatmospheric pressure application.

The vessel holding the adsorbent having fluid adsorbed thereon can be formed of any suitable vessel material(s) of construction, such as metals (e.g., steel, stainless steel, aluminum, copper, brass, bronze, and alloys thereof), glasses, ceramics, vitreous materials, polymers, and composite materials.

The vessel can be of any suitable shape and size, as appropriate to the specific fluid storage and dispensing application. The vessel can, for example, be of a rectangular parallelepiped shape, being of elongate vertically upstanding form, with a square cross-section, or the vessel can be cylindrical with a circular cross-section, or in any other appropriate shape, size and form.

In one embodiment, the invention utilizes a physical adsorbent of monolithic form in a rectangular parallelepiped vessel defining a closed interior volume and having a port to which is coupled a gas dispensing assembly, for selective discharge of gas from the vessel. The sorbent medium in the monolithic form of the present invention provides sufficient capacity for sorptive retention of the sorbate gas in the desired quantity, good desorptive release of gas under desorption conditions, and good working capacity with good heels behavior (i.e., high extent of desorption of initially adsorbed gas), and has an appropriate sorptive affinity for the gas of interest so that low gas pressure is maintained in the interior volume of the vessel during storage of gas therein.

The physical adsorbent in accordance with the present invention can be of any suitable monolithic form, e.g., in the form of blocks, bricks, boules or similar forms of the adsorbent material that are of a size commensurate with the fluid storage and dispensing vessel, so that vessel contains one or a small number, e.g., less than 75, more preferably less than 20, of the discrete monolithic articles. In a further preferred aspect, the vessel contains no more than 8 such discrete monolithic articles, even more preferably no more than four such articles, and most preferably the vessel contains a single monolithic physical adsorbent article.

The monolithic article(s) deployed in the fluid storage and dispensing vessel provide(s) an aggregate sorbent mass that is preferably conformed in size and shape to the interior volume of the fluid storage and dispensing vessel, so that the sorbent mass of the monolithic article(s) occupies at least 60% of the interior volume of the vessel, preferably in a range of from about 75% to about 95% of the interior volume of such vessel.

If provided as a single monolithic sorbent article, the sorbent medium may for such purpose be formed in situ in the vessel, e.g., by pyrolysis of an organic resin that is in liquid or otherwise flowable form, with which the vessel is filled to a desired extent prior to pyrolysis of same in the vessel.

If alternatively provided in the form of multiple monolithic articles, each of such articles can be provided with a length that is between 0.3 and 1.0 times the height of the interior volume of the vessel, and a cross-sectional area that is between 0.1 and 0.5 times the rectangular cross-sectional area of the vessel. Each monolithic member can have a rectangular parallelepiped shape for maximizing the volumetric usage of the interior volume of the vessel when the vessel is of rectangular parallelepiped shape, wherein each of the monolithic members may be laterally and/or longitudinally abutted in surface contact with adjacent monolithic members in the interior volume of the vessel. Alternatively, in some instances, it may be desirable for the sorbent monolithic members to be in the form of solid cylinders, with the respective cylindrical members being loaded into the interior volume so as to tangently abut one another along their facing side surface, and to at least partially abut one another in face-to-face contact at their circular cross-section end surfaces. In fluid storage and dispensing vessels of shapes other than cubic or other rectangular parallelepiped shapes, the monolithic sorbent article(s) may be correspondingly formed to conform to the shape of the interior volume of the vessel. For example, the fluid storage and dispensing vessel can be of cylindrical shape, with monolithic adsorbent articles therein comprising a vertical stack of disc-shaped bodies of adsorbent, each having diameter conforming it at its periphery to the shape of the vessel, in close proximity to the facing inner wall surface of the vessel.

The level of improvement attendant the use of a monolithic form of activated carbon over finely divided particulate forms of the prior art is unexpected because physical adsorbent materials are generally classified in terms of their surface area available for sorptively retaining the working gas (adsorbate), and hence particulate forms with their high surface to volume ratio have been considered inherently superior to bulk forms such as blocks and bricks (i.e., monolithic forms) having a lower apparent surface-to-volume ratio. Thus, one would expect intuitively that monolithic forms of adsorbent would be low efficiency forms, having a reduced sorptive capacity and working capacity.

It has been discovered, however, that a carbon monolith may be formed having a similar micropore volume as corresponding bead carbon, but with a substantially higher density, e.g., a density in a range of from about 25% to about 80% higher than the compacted density of the corresponding bead carbon, and that such high density monolith when used in a physical adsorbent-based gas storage and dispensing system provides a striking improvement in mass of gas adsorbed per unit volume of the sorbent in comparison to a bed of bead carbon.

Carbon monoliths useful in the broad practice of the present invention include gross brick, block and ingot forms, as bulk forms, preferably having three-dimensional (x, y, z) character wherein each of such dimensions is greater than 1.5, and preferably greater than 2 centimeters. For example, the carbon monolith may be in the form of a monolith briquette, as made from a polymeric char such as polyvinylidene chloride (PVDC) or other suitable polymer, having a high bulk density (measured with voids), e.g., on the order of from about 0.80 to about 2.0 grams per cubic centimeter, with high working capacity (high microporosity and low heel) and pore tortuosity that is sufficiently low to ensure ready and rapid rate adsorption and desorption.

In one embodiment, the monolithic carbon sorbent of the invention includes a doping agent on the active carbon to minimize decomposition of the sorbate fluid during extended storage. Illustrative of doping agents that can be usefully employed in the broad practice of the invention are boric acid ($H_3BO_3$), sodium tetraborate ($Na_2B_4O_7$), sodium silicate ($Na_2SiO_3$) and disodium hydrogen phosphate ($Na_2HPO_4$).

The monolithic carbon adsorbent articles in another aspect can have a length to cross-sectional dimension ratio, L/D, that is from about 2 to about 20, and more preferably from about 4 to about 15, where L is the length or major axis dimension of the monolithic carbon sorbent article, and D is the transverse or minor axis dimension. In a specific embodiment, the monolithic carbon adsorbent is provided in the form of 1"×1" square cross-section PVDC char monolith briquettes, approximately 6" in height.

A preferred monolithic carbon adsorbent comprises pyrolysis products of Saran A, Saran MC-10S or Saran XPR-1367-D-01452-050 PVDC homopolymers or copolymers, as ultramicroporous carbons having a high proportion of slit-shaped pores of small dimension, e.g., in a range of from about 0.3 to about 0.75 nanometers.

Figure 5:
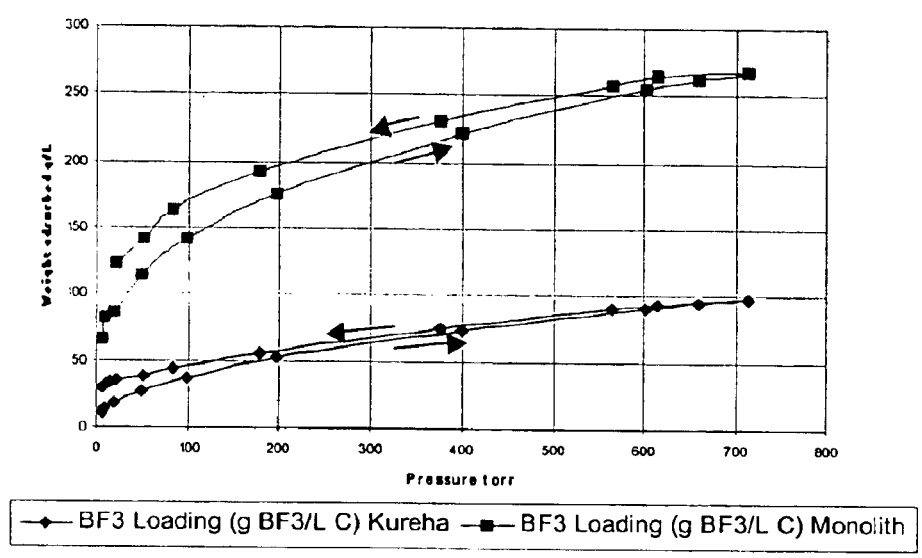
FIG. 5 is a graph of adsorbed weight, in grams, of boron trifluoride ($BF_3$) adsorbed per liter of carbon, as a function of pressure level, in torr, for a Kureha 578-66-6 bead activated carbon (data points marked by solid diamond markers) and carbon formed from polyvinylidene chloride polymer (Saran A, Dow Chemical Co.)(data points marked by solid square markers).

When the monolithic carbon sorbent has pores with a diameter of less than about 2 nanometers, the monolithic carbon sorbent is able to adsorb gases, e.g., boron trifluoride, above their critical temperature to an extent that is proportional to the micropore volume of the sorbent material. Preferred monolithic carbon sorbent materials for such purpose have a high proportion of pores, e.g., at least 50% of porosity, in the small micropore, e.g., ultramicropore, size range. This effect may be seen by reference to FIG. 5, which is a graph of weight in grams of boron trifluoride ($BF_3$) adsorbed per liter of carbon, as a function of pressure level, in torr, for (i) a Kureha bead activated carbon (data points marked by solid diamond markers) and (ii) carbon formed from polyvinylidene chloride polymer (Saran A, Dow Chemical Co.)(data points marked by solid square markers).

Although micropore volume is an important criterion for selecting carbon for use in the monolithic carbon adsorbent systems of the invention, and micropore volume is desirably maximized, gases stored in a fixed volume vessel are appropriately compared on a volume per liter of adsorbent basis. The adsorbent packing density in such instance becomes extremely important. To this end, the monolithic carbon eliminates void volume in the fluid storage and dispensing vessel in which it is employed.

Void volume in the fluid storage and dispensing vessel in accordance with the present invention, in a preferred embodiment, does not exceed about 40% of the total interior volume of the vessel, and more preferably is as low as possible. The packing density of the monolithic carbon sorbent is desirably as high as possible, with maximum micropore volume on a volume per volume of adsorbent basis, and a high proportion of pore volume being in ultramicropores. The conformation of the micropores is also important, with the pores being desirably slit-shaped to provide high adsorption levels, but not so small so that the slit conformation interferes with ready gas release under desorption conditions, e.g., desorption at pressure levels on the order of 40 torr.

During activation of carbon to form activated carbon, the pores are widened at elevated temperature in the presence of a non-oxidizing gas such as nitrogen, followed by exposure to an oxidizing gas such as oxygen or steam for a short duration, and then cooling in a non-oxidizing atmosphere. In such activation, the level of burn-off of the material is carefully controlled, since a high level of burn-off causes widening of the pores, with an increase in micropore volume and concomitant reduction of particle density.

Figure 2:
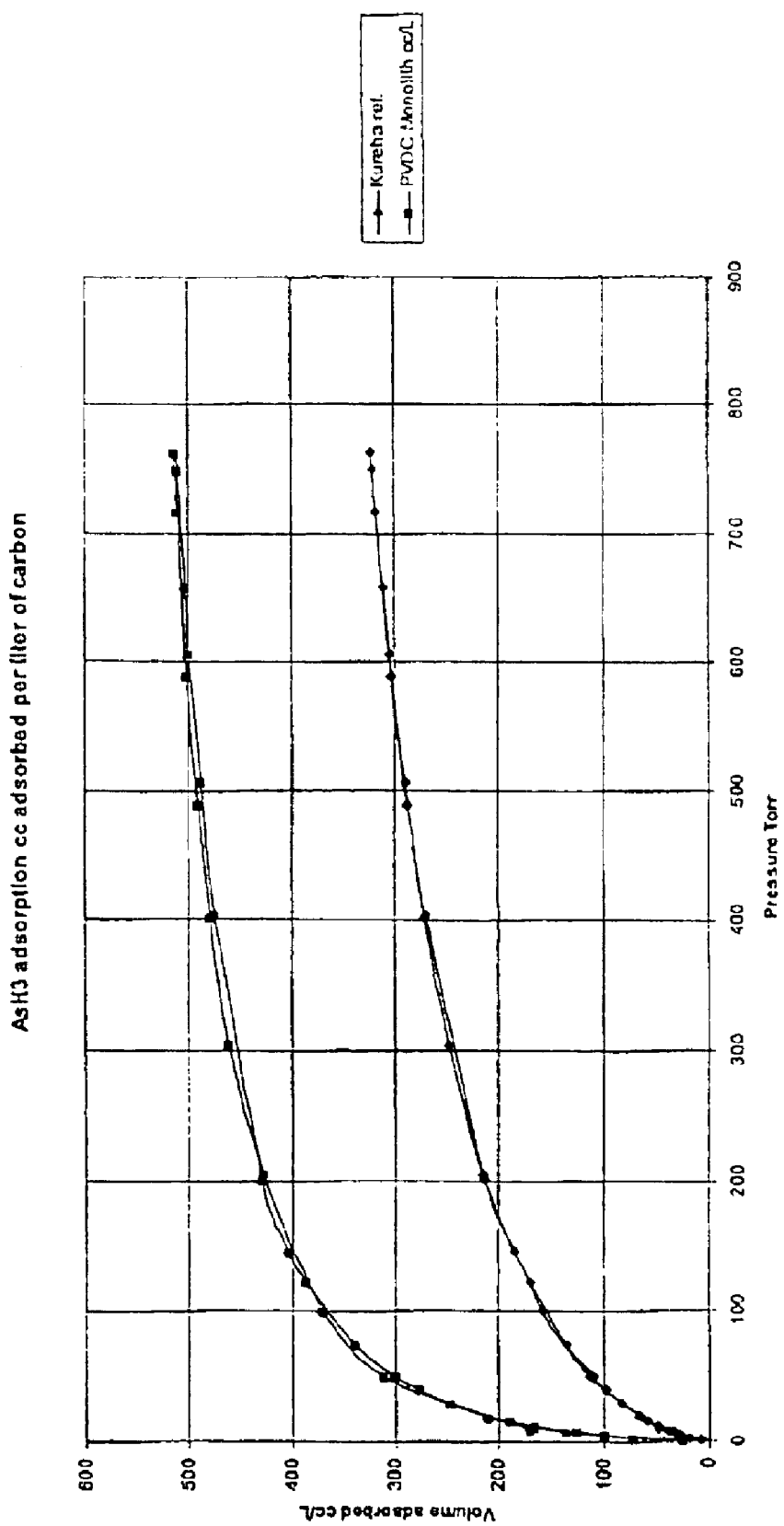
FIG. 2 is a graph of volume, in cubic centimeters, of arsine ($AsH_3$) adsorbed per liter of carbon, as a function of pressure level, in torr, for a Kureha 578-66-6 bead activated carbon (data points marked by solid diamond markers) and carbon formed from polyvinylidene chloride polymer (Saran A, Dow Chemical Co.)(data points marked by open triangular markers).

The monolithic carbon adsorbent of the invention can be suitably formed in any suitable manner. In one embodiment, the monolithic carbon is formed from a polymeric material such as the polyvinylidene chloride polymer commercially available from The Dow Chemical Company (Midland, Mich.) as Saran A or Saran MC-10S polymer, as pressure molded at suitable pressure, e.g., a pressure in a range of from about 10 kilopounds per square inch to about 20 kilopounds per square inch, and then pyrolyzed in a nitrogen gas stream at a temperature of from about 600° C. to about 900° C., e.g., on the order of about 700° C. This process produces a carbon sorbent material having a greatly increased fill density (viz., the weight of gas adsorbed, e.g., in grams, per liter of carbon), as shown in the graphs of FIGS. 1 and 2.

The monolithic carbon adsorbent of the invention represents a significant departure from the practice of the prior art, which has utilized finely divided particles, such as bead activated carbon having a particle diameter of 0.1–1.0 centimeter and more typically a particle diameter of 0.25–2.0 millimeters, or which, in the case of bulk microporous carbon materials (see Wojtowicz et al. U.S. patent application Publication US2002/0020292 A1 published Feb. 21, 2002), has utilized high temperature, e.g., >1000° C. and preferably >1100° C., to induce high graphitization levels, in combination with activation involving repetitive chemisorption/desorption steps performed as many as 76 times (see Quinn, et al. U.S. Pat. No. 5,071,820) to achieve suitable micropore volume, surface area and micropore volume per unit volume of carbon adsorbent, a time-consuming and costly approach to obtaining a suitable sorbent material for high-pressure gas storage applications (Wojtowicz et al. U.S. patent application Publication US2002/0020292 A1 discloses that optimal storage capacity for the sorbate gas requires that the gas "be introduced into the storage vessel at a pressure in the range of from about 500 psi to about 3500 psi," page 2, paragraph [0013], last sentence).

In contrast to these prior art approaches, the monolithic carbon sorbent of the present invention is formed from a suitable polymeric material, e.g., a polymer selected from among polyvinylidene chloride, phenol-formaldehyde resins, polyfurfuryl alcohol, coconut shells, peanut shells, peach pits, olive stones, polyacrylonitrile, polyacrylamide, etc., that is pressure-moldable, e.g., at a molding pressure up to about 20,000 psi or higher, to yield a pressure-molded "green resin" body that is pyrolyzable at temperature below 1000° C., preferably not exceeding about 900° C., e.g., in a range of from about 500° C. to about 900° C., and more preferably in a range of from about 600° C. to about 900° C., to yield a monolithic carbon material having a fill density of suitably high value for the intended gas storage and dispensing application. Monolithic carbon sorbents useful in the practice of the present invention include those having a fill density measured for arsine gas at 25° C. and a pressure of 650 torr that is in excess of 400 grams arsine per liter of carbon adsorbent, and preferably greater than 450 grams arsine per liter of carbon adsorbent.

The pyrolysis product may be employed as a monolithic sorbent body in accordance with the present invention, as is, but such pyrolysis product preferably is activated in a manner producing a monolithic carbon sorbent product with ultramicroporosity having a high proportion, e.g., at least 30% of porosity, and preferably at least 60% of porosity, of slit-shaped pores having a size in a range of from about 0.3 to about 0.72 nanometer and a significant porosity, e.g., at least 20%, and preferably at least 30%, of the overall porosity comprising micropores, with diameter <2 nanometers. The activation process can include any suitable processing steps for enhancing the sorptive affinity of the material for the sorbate gas of interest or otherwise improving the characteristics of the sorbent medium for adsorption/desorption duty. For example, the activation process can include heating in a non-oxidizing atmosphere, e.g., of nitrogen, argon, helium or other non-oxidizing gas, followed by switching of the atmosphere to an oxidizing atmosphere, such as carbon dioxide or steam for a brief duration, before switching to a non-oxidizing atmosphere and cooling to ambient temperature (e.g., room temperature). The specifics of the activation process, e.g., the temperature levels and duration of the successive steps can be readily determined within the skill of the art without undue experimentation, by simple variation of respective process conditions and analytic determination of the resulting sorbent performance, such as fill density, porosimetry characterization, etc.

FIG. 1 is a graph of weight in grams of phosphine ($PH_3$) adsorbed per liter of carbon, as a function of pressure level, in torr, for a Kureha 578-66-6 bead activated carbon (data points marked by solid diamond markers), a Takachiho ABF 14-03 particulate activated carbon (Takachiho Kabushiku Kogyo, Ltd., Tokyo, Japan)(data points marked by solid square markers), and monolithic carbon formed from polyvinylidene chloride polymer (Saran A, Dow Chemical Co.) (data points marked by open triangular markers).

The data in FIG. 1 show that the monolithic carbon formed from PVDC polymer has a substantially higher weight of adsorbed phosphine per liter of carbon than either of the bead activated carbon adsorbent or the Takachiho particulate activated carbon adsorbent, being generally more than twice the sorptive loading of phosphine over the pressure range of from 0 torr to 750 torr.

FIG. 2 is a graph of volume, in cubic centimeters, of arsine ($AsH_3$) adsorbed per liter of carbon, as a function of pressure level, in torr, for a Kureha 578-66-6 bead activated carbon (data points marked by solid diamond markers) and carbon formed from polyvinylidene chloride polymer (Saran A, Dow Chemical Co.)(data points marked by open triangular markers).

FIG. 2 evidences the superiority of the monolithic carbon adsorbent over bead activated carbon for arsine loading. The volumetric loading of arsine, in cubic centimeters, per liter of carbon is 50–100%+ higher for the monolithic carbon adsorbent over the pressure range of 0 torr to 770 torr.

Set out below in Table 1 are fill density values of arsine on the three types of adsorbent materials discussed above in connection with FIG. 1, including Kureha 578-66-6 bead activated carbon, Takachiho ABF 14-03 particulate activated carbon, and PVDC char monolithic adsorbent. Each of the materials was evaluated for two samples at an arsine pressure of 650 torr. Fill density was determined on a weight basis, as grams of adsorbed arsine per gram of adsorbent, as well as on a volumetric basis, as grams of adsorbed arsine per liter of adsorbent.

TABLE 1

Arsine Capacity on Non-Monolithic Activated Carbon and Monolithic Carbon

| Adsorbent | Fill Density at 650 Torr Pressure (grams arsine/ gram of adsorbent) | Fill Density at 650 Torr Pressure (grams arsine/ liter of adsorbent) |
|---|---|---|
| Kureha 578-66-6 (sample 1) | 0.51 | 301 |
| Kureha 578-66-6 (sample 2) | 0.51 | 301 |
| Takachiho ABF 14-03 (sample 1) | 0.55 | 319 |
| Takachiho ABF 14-03 (sample 2) | 0.55 | 319 |
| PVDC char (sample 1) | 0.43 | 486 |
| PVDC char (sample 2) | 0.45 | 504 |

The results in Table 1 show that while the fill density on a weight basis for the monolithic carbon adsorbent was approximately 15–20% lower than for the non-monolithic activated carbon adsorbents, the fill density of the monolithic carbon adsorbent on a volumetric basis was well over 50% higher than the corresponding fill densities of the non-monolithic activated carbon adsorbents.

Table 2 below is a corresponding fill density tabulation for fill density values of phosphine on the three types of adsorbent materials discussed above in connection with FIG. 1, including Kureha 578-66-6 bead activated carbon, Takachiho ABF 14-03 particulate activated carbon, and PVDC char monolithic adsorbent.

TABLE 2

Phosphine Capacity on Non-Monolithic Activated Carbon and Monolithic Carbon

| Adsorbent | Fill Density at 650 Torr Pressure (grams phosphine/ gram of adsorbent) | Fill Density at 650 Torr Pressure (grams phosphine/ liter of adsorbent) |
|---|---|---|
| Kureha 578-66-6 | 0.165 | 97.4 |
| Takachiho ABF 14-03 | 0.184 | 107 |
| PVDC char | 0.188 | 212 |

The results in Table 1 show that the monolithic carbon adsorbent (PVDC char) had a fill density on both weight and volumetric basis that were above those of the non-monolithic forms of activated carbon adsorbent, with the fill density on a volumetric basis being on the order of 100% higher than the volumetric fill density of phosphine on the non-monolithic forms of activated carbon.

The sorbate fluid retained on the monolithic carbon adsorbent in the broad practice of the present invention can be of any suitable type, including for example, hydride gases (such as arsine, phosphine, germane, silane, mono-, di-, and tri-substituted silanes, e.g., alkyl silanes of such types), halide gases (such as boron trifluoride, boron trichloride, halogen-substituted silanes, etc.) and gaseous organometallic compositions.

Illustrative sorbate gas species that are usefully storable and dispensable in the practice of the invention include silane, germane, arsine, phosphine, phosgene, diborane, germane, ammonia, stibine, hydrogen sulfide, hydrogen selenide, hydrogen telluride, nitrous oxide, hydrogen cyanide, ethylene oxide, the deuterated hydrides, halide (chlorine, bromine, fluorine, and iodine) compounds, including such compounds as $F_2$, $SiF_4$, $Cl_2$, $ClF_3$, $GeF_4$, $SiF_4$, boron halides, etc., and organometallic compounds of metals such as aluminum, barium, strontium, gallium, indium, tungsten, antimony, silver, gold, palladium, gadolinium, etc.

The pressure at which the sorbate gas is stored in the vessel may be any suitable pressure appropriate to the application for which the gas storage and dispensing system of the invention is employed. Illustrative pressure levels generally useful in the practice of the invention include pressures not exceeding about 2500 torr, more preferably not exceeding 2000 torr, e.g., a pressure in a range of from about 20 torr to about 1800 torr, or more restrictively from about 20 torr to about 1200 torr. For applications such as ion implantation, the pressure of the gas in the gas storage and dispensing vessel typically does not exceed about 800 torr, and the stored gas may be at subatmospheric pressure, e.g., a pressure in a range of from about 20 torr to about 750 torr.

Figure 3:
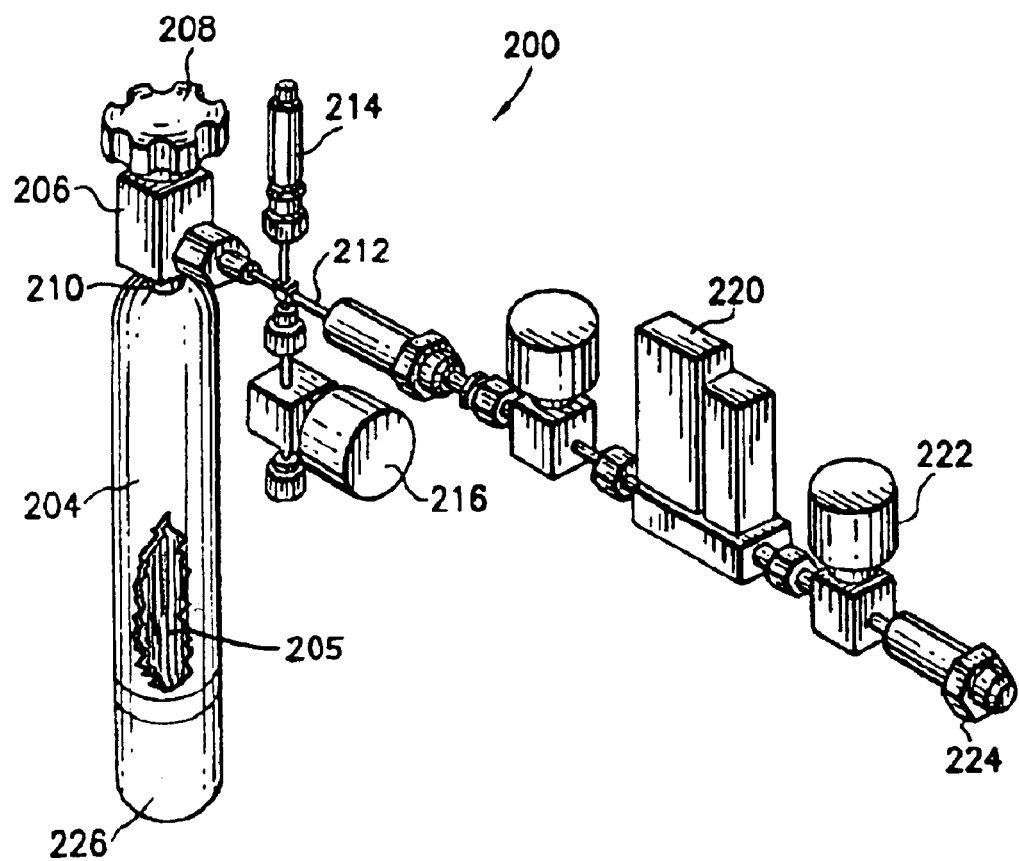
FIG. 3 is a schematic representation of a storage and delivery system utilizing a monolithic sorbent, according to one embodiment of the invention.

FIG. 3 is a schematic representation of a storage and delivery system according to one embodiment of the invention.

As shown, the storage and dispensing system 200 comprises a storage and dispensing vessel 204 that is joined at its upper portion to a valve head 206 comprising part of a dispensing assembly including manual actuator 208 for the valve head on the cylinder. The vessel may be formed of any suitable material of construction, e.g., comprising material such as metals, glasses, ceramics, vitreous materials, polymers, and composite materials. Illustrative metals for such purpose include steel, stainless steel, aluminum, copper, brass, bronze, and alloys thereof. The valve head is joined by means of coupling 210 to a dispensing conduit 212 having disposed therein a pressure transducer 214, an inert purge unit 216 for purging the dispensing assembly with inert gas, a mass flow controller 220 for maintaining constant flow rate through the dispensing conduit 212 during the dispensing operation, and a filter 222 for removing particulates from the dispensed gas prior to its discharge from the dispensing assembly.

The dispensing assembly further comprises a coupling 224, for matably engaging the dispensing assembly with downstream piping, valving, or other structure associated with the locus of use of the desorbed fluid, e.g., involving a semiconductor manufacturing facility such as an ion implantation tool using the dispensed gas as an implant species.

The fluid storage and dispensing vessel 204 is shown as having a wall 226 that is partially broken away to show the interior monolithic sorbent body 205.

Figure 4:
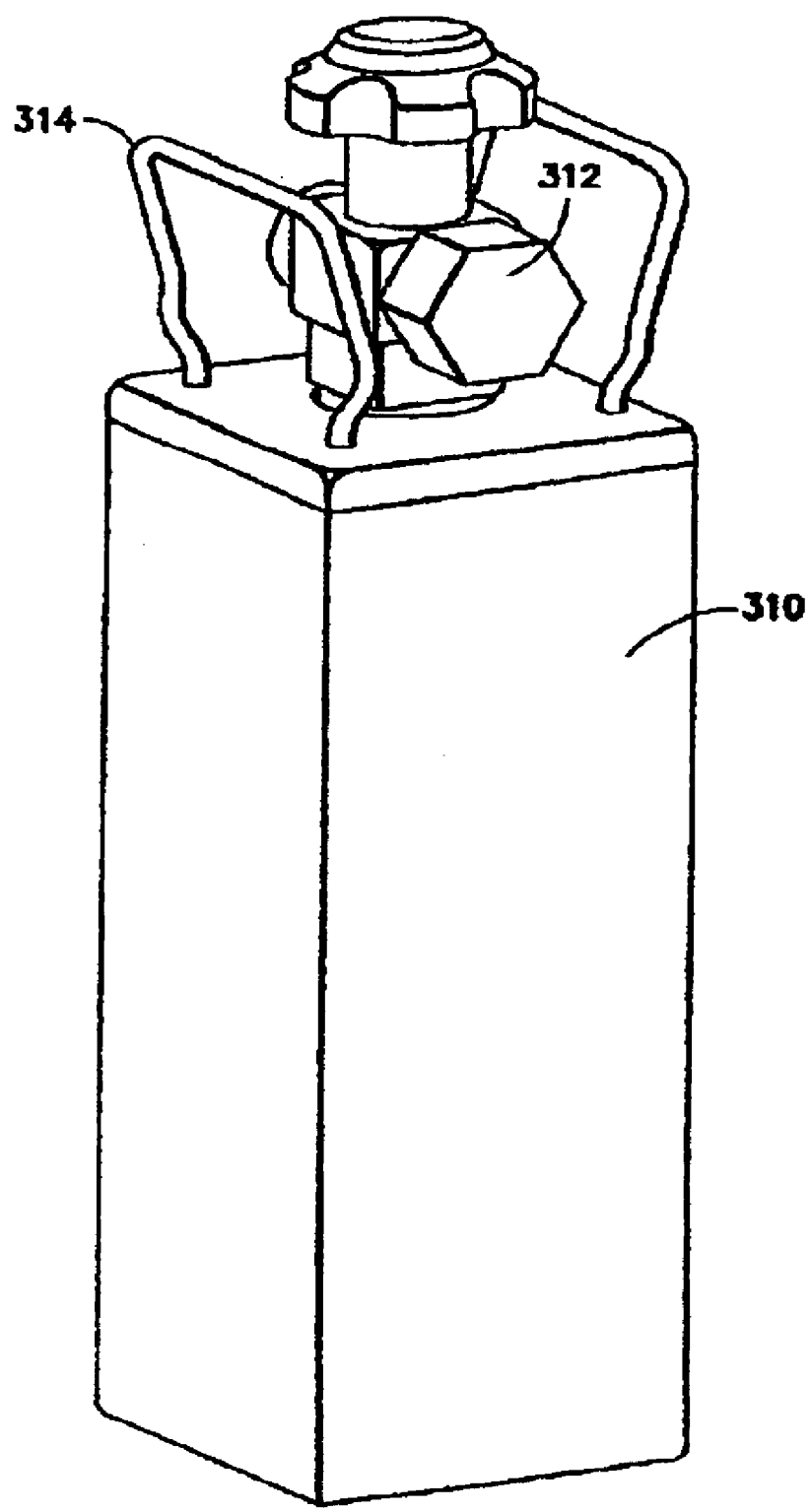
FIG. 4 is a perspective view of a rectangular parallelepiped fluid storage and dispensing vessel utilizing a monolithic sorbent, according to another embodiment of the present invention.

FIG. 4 is a perspective view of a fluid storage and dispensing apparatus employing a rectangular parallelepiped fluid storage and dispensing vessel 310 according to another and preferred aspect of the present invention. The rectangular parallelepiped fluid storage and dispensing vessel 310 is equipped with a pipe valve connection valve head 312 and handles 314 welded to the top face of the vessel. The vessel 310 in a specific embodiment is formed with a welded steel wall construction, having a square cross-section along the vertical (longitudinal) axis of the vessel. The walls of the vessel are 0.100 inch thick carbon steel, and the interior volume of the vessel is 3.62 liters. The handles 314 are ¼ inch rod stock, formed into the shape shown, and welded at the respective ends to the vessel 310.

The dispensing valve of the pipe valve connection valve head 312 is threadably engaged with the vessel 310, by a 1½" pipe thread connection. The valve head may have any suitable number of ports, e.g., single port valve heads, dual port valve heads, 3-port valve heads, etc.

The rectangular parallelepiped fluid storage and dispensing vessel 310 contains a monolithic carbon adsorbent in its interior volume, wherein the monolithic mass may include one or alternatively multiple monolithic carbon bodies, each preferably of a rectangular parallelepiped shape to conform to the shape of the interior volume of the vessel, as previously described.

It will be appreciated that the compositions and methods of the invention may be practiced in a widely variant manner, consistent with the broad disclosure herein. Accordingly, while the invention has been described herein with reference to specific features, aspects, and embodiments, it will be recognized that the invention is not thus limited, but is susceptible of implementation in other variations, modifications and embodiments. Accordingly, the invention is intended to be broadly construed to encompass all such other variations, modifications and embodiments, as being within the scope of the invention hereinafter claimed.

What is claimed is:

1. A carbon monolith prepared by a method comprising: molding a pyrolyzable material into a monolithic shape; and pyrolyzing the pyrolyzable material under pyrolysis conditions thereby producing a carbon monolith that is characterized by at least one of the following characteristics:
   (a) a fill density measured for arsine gas at 25° C. and pressure of 650 torr that is greater than 400 grams arsine per liter of carbon monolith;
   (b) at least 30% of overall porosity of said carbon monolith comprising slit-shaped pores having a size in a range of from about 0.3 to about 0.72 nanometer, and at least 20% of the overall porosity comprising micropores of diameter <2 nanometers; and
   (c) a bulk density of from about 0.80 to about 2.0 grams per cubic centimeter, wherein said pyrolysis conditions comprise a temperature below 1000° C.

2. The carbon monolith of claim 1, having a fill density measured for arsine gas at 25° C. and pressure of 650 torr that is greater than 400 grams arsine per liter of carbon monolith.

3. The carbon monolith of claim 1, wherein at least 30% of overall porosity of said carbon monolith comprises slit-shaped pores having a size in a range of from about 0.3 about 0.72 nanometer, and at least 20% of the overall porosity comprises micropores of diameter <2 nanometers.

4. The carbon monolith of claim 1, wherein said pyrolysis conditions comprise a temperature below 1000° C., and said carbon monolith has a bulk density of from about 0.80 to about 2.0 grams per cubic centimeter.

5. The carbon monolith of claim 1, having a form that is selected from the group consisting of blocks, bricks, and boules.

6. The carbon monolith of claim 1, wherein said method further comprises an activating step.

7. The carbon monolith of claim 6, wherein said activating step comprises exposure of the monolith to a non-oxidizing elevated temperature environment, followed by exposure of the monolith to an oxidizing environment.

8. The carbon monolith of claim 7, wherein said non-oxidizing environment comprises nitrogen.

9. The carbon monolith of claim 7, wherein said oxidizing environment comprises carbon dioxide.

10. The carbon monolith of claim 7, wherein said oxidizing environment comprises steam.

11. The carbon monolith of claim 7, wherein the monolith is cooled in a non-oxidizing environment after said exposure to said oxidizing environment.

12. The carbon monolith of claim 1, disposed in a gas storage and dispensing vessel.

13. The carbon monolith of claim 12, disposed in said gas storage and dispensing vessel by a process that comprises charging the vessel with a fluid for which the monolith has sorptive affinity, adsorbing the fluid thereon; sealing the vessel to enclose the monolith holding adsorbed fluid thereon in an interior volume of the vessel; and coupling the vessel to a dispensing assembly for dispensing desorbed fluid from the vessel.

14. The carbon monolith of claim 13, conforming in size and shape to the interior volume of the vessel.

15. The carbon monolith of claim 13, occupying at least 60% of the interior volume of the vessel.

16. The carbon monolith of claim 13, occupying from about 75% to about 95% of the interior volume of the vessel.

17. The carbon monolith of claim 13, comprising a multiplicity of discrete articles.

18. The carbon monolith of claim 17, wherein each of said discrete articles has a length that is between 0.3 and 1.0 times the height of the intereior volume of the vessel, and a cross-sectional area that is between 0.1 and 0.5 times the cross-sectional area of the interior volume of the vessel.

19. The carbon monolith of claim 17, wherein each of said discrete articles has a rectangular parallelepiped shape.

20. The carbon monolith of claim 17, wherein each of said discrete articles is laterally and/or longitudinally abutted in surface contact with adjacent discrete articles in the interior volume of the vessel.

21. The carbon monolith of claim 17, wherein each of said discrete articles has a solid cylinder form.

22. The carbon monolith of claim 17, wherein each of said discrete articles has a length to cross-sectional dimension ratio, L/D, that is from about 2 to about 20, where L is the length or major axis dimension of the article, and D is the transverse or minor axis dimension.

23. The carbon monolith of claim 17, wherein each of said discrete articles has a length to cross-sectional dimension ratio, L/D, that is from about 4 to about 15, where L is the length or major axis dimension of the article, and D is the transverse or minor axis dimension.

24. The carbon monolith of claim 13, comprising less than 75 discrete monolithic articles.

25. The carbon monolith of claim 13, comprising less than 20 discrete monolithic articles.

26. The carbon monolith of claim 13, comprising less than 8 discrete monolithic articles.

27. The carbon monolith of claim 13, comprising less than 4 discrete monolithic articles.

28. The carbon monolith of claim 12, wherein said pyrolyzable material is pyrolyzed in situ in the gas storage and dispensing vessel.

29. The carbon monolith of claim 1, wherein said pyrolyzable material comprises an organic resin.

30. The carbon monolith of claim 1, wherein said pyrolyzable material comprises a material selected from the group consisting of polyvinylidene chloride, phenol-formaldehyde resins, polyfurfuryl alcohol, coconut shells, peanut shells, peach pits, olive stones, polyacrylonitrile, and polyacrylamide.

31. The carbon monolith of claim 1, wherein said pyrolyzable material is pyrolyzed in situ in a gas storage and dispensing vessel.

32. The carbon monolith of claim 1, wherein said pyrolyzable material comprises PVDC resin.

33. The carbon monolith of claim 1, further comprising a doping agent.

34. The carbon monolith of claim 33, wherein said doping agent comprises at least one agent selected from the group consisting of boric acid, sodium tetraborate, sodium silicate, and disodium hydrogen phosphate.

35. The carbon monolith of claim 1, wherein said method further comprises disposing said monolith in a gas storage and dispensing vessel; charging to the vessel a fluid for which said monolith has sorptive affinity, to adsorb the fluid thereon; sealing the vessel to enclose said monolith holding adsorbed fluid thereon in an interior volume of the vessel; and coupling the vessel to a dispensing assembly for dispensing desorbed fluid from the vessel.

36. The carbon monolith of claim 35, wherein the fluid comprises a gas having utility in semiconductor manufacturing.

37. The carbon monolith of claim 35, wherein the fluid comprises a gas selected from the group consisting of hydrides, halides and organometallic gaseous reagents.

38. The carbon monolith of claim 35, wherein the fluid comprises a gas selected from the group consisting of silane, germane, arsine, phosphine, phosgene, diborane, germane, ammonia, stibine, hydrogen sulfide, hydrogen selenide, hydrogen telluride, nitrous oxide, hydrogen cyanide, ethylene oxide, deuterated hydrides, halide (chlorine, bromine, fluorine, and iodine) compounds, and organometallic compounds.

39. The carbon monolith of claim 35, wherein the fluid has a pressure in said interior volume not exceeding about 2500 torr.

40. The carbon monolith of claim 35, wherein the fluid has a pressure in said interior volume not exceeding about 2000 torr.

41. The carbon monolith of claim 35, wherein the fluid has a pressure in said interior volume in a range of from about 20 to about 1800 torr.

42. The carbon monolith of claim 35, wherein the fluid has a pressure in said interior volume in a range of from about 20 to about 1200 torr.

43. The carbon monolith of claim 35, wherein the fluid has a subatmospheric pressure in said interior volume.

44. The carbon monolith of claim 35, wherein the fluid has a pressure in said interior volume in a range of from about 20 to about 750 torr.

45. The carbon monolith of claim 35, wherein the vessel comprises a material of construction selected from the group consisting of metals, glasses, ceramics, vitreous materials, polymers, and composite materials.

46. The carbon monolith of claim 35, wherein the vessel comprises a metal material of construction.

47. The carbon monolith of claim 46, wherein said metal is selected from the group consisting of steel, stainless steel, aluminum, copper, brass, bronze, and alloys thereof.

48. The carbon monolith of claim 35, wherein the monolith has at least 20% of its porosity in pores with a diameter of less than 2 nanometers.

49. The carbon monolith of claim 35, wherein the fluid comprises boron trifluoride.

50. The carbon monolith of claim 35, wherein the vessel has a rectangular parallelepiped shape.

51. The carbon monolith of claim 35, wherein the vessel has an elongate shape with a square cross-section.

52. The carbon monolith of claim 35, wherein the vessel has a cylindrical shape.

53. The carbon monolith of claim 35, wherein the vessel is of a vertically upstanding configuration.

* * * * *